R. D. MacLENNAN.
Sash Holder.
No. 201,620. Patented March 26, 1878.
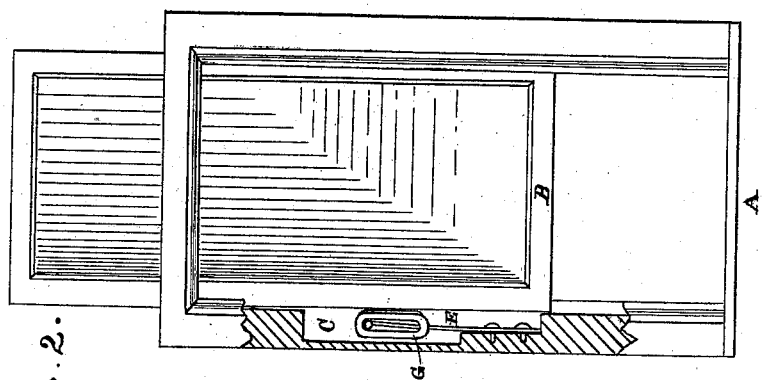
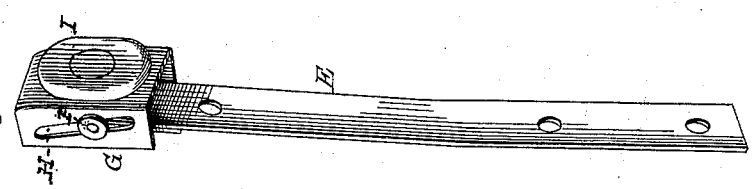
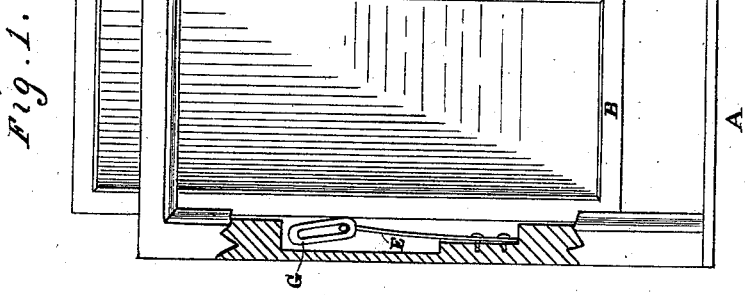
Witnesses
Jno. L. Boone
Geo. H. Strong.
Inventor
Roderick D. MacLennan.
by Dewey &
Atty.

UNITED STATES PATENT OFFICE.

RODERICK D. MACLENNAN, OF LOS ANGELES, CALIFORNIA, ASSIGNOR OF ONE-HALF HIS RIGHT TO ANGUS S. McDONALD, OF SAME PLACE.

IMPROVEMENT IN SASH-HOLDERS.

Specification forming part of Letters Patent No. 201,620, dated March 26, 1878; application filed November 10, 1877.

*To all whom it may concern:*

Be it known that I, RODERICK D. MACLENNAN, of the city and county of Los Angeles, and State of California, have invented an Improved Sash-Supporter; and I do hereby declare the following to be a full, clear, and exact description thereof, reference being had to the accompanying drawings.

My invention relates to a novel device for supporting a window-sash; and it consists of a box set in a recess in a sash-groove, and pressed against the sash-rail, so as to give sufficient friction to serve as a stop. This friction-box is supported and held in contact with the sash-rail by a spring in such a manner that when the window is being raised the tension of the spring is released, and the box presses but lightly against the sash-rail; but when the window is lowered the tension of the spring is increased, and the box pressed against the sash-rail with sufficient force to support it, all as hereinafter more fully described and claimed.

My invention will be more fully understood by referring to the accompanying drawings, in which—

Figure 1 is a section showing the window when it is being raised. Fig. 2 is a section showing the window supported by the box and spring. Fig. 3 is an enlarged perspective view of the spring and the open-end box, with its inclined slots and friction-face.

Let A represent a window-frame, and B the window-sash. In the sash-groove, on each side of the window-frame, I make a recess, C, and in each of these recesses I secure a vertical flat spring, E. In the top of the recess, and at the upper end of the spring E, I place an open-ended box, G, in such a manner that the bottom of the box forms the outside face, which is in contact with the outer edge of the sash-rail.

In each side of the box G, I make a narrow inclined slot or opening, H. These slots incline in the same direction, their lower ends being nearer the outside face of the box than their upper ends.

A pin, F, is secured on the top of the spring E, and its ends, passing through the slots in the box G, form journals, on which the box moves, as hereinafter described.

The bottom or outside face of the box G, I cover with some soft yielding or elastic substance, I, such as rubber or leather.

The recess in the sash-groove I make deeper than the depth of the box G; but the box is held continually away from the bottom of the hole, and is pressed against the sash-rail by the tension of the spring E.

The operation of the box and spring in supporting the sash will then be as follows: The window, when being raised, will carry the box G with it so far as the slots in the sides of the box will allow, the box being kept in constant contact with the sash-rail by the tension of the spring E, and the yielding face, which is in contact with the sash-rail, will furnish sufficient friction to carry the box with the sash-rail as the window is raised.

When the window is moving upward the box is raised as high as the slots will allow, and the force it exerts against the sash-rail is very slight, because the spring is free, and exerts only its normal tension.

In raising the sash no greater power than that required to lift the weight of the sash will be required. But when the upward pressure on the sash is removed the box will drop, and the pins moving in the inclined slots will carry it outward against the sash, thus increasing the tension of the spring sufficiently to stop and hold the sash at the position in which it is left.

To lower the window-sash a little extra force is required to overcome the tension of the spring and the friction of the box against the sash; but this is hardly noticeable.

My invention is easily applied to any window, is formed of few parts, simply constructed, and is, in every way, a desirable sash-supporter.

I have shown and described a flat spring for supporting and controlling the box; but any form of spring, or other suitable device, may be employed.

Having thus described my invention, what I claim, and desire to secure by Letters Patent, is—

1. The open-ended box G, with its outside friction-face I, supported in a recess in the window-frame, opposite the edge of the sash, by a spring, E, substantially as and for the purpose described.

2. The open-ended box G, having the inclined slots H and outside friction-face I, in combination with the spring E, with its gudgeons, said box being secured in a recess, C, opposite the sash-frame, substantially as above described.

In witness whereof I have hereunto set my hand and seal.

RODERICK D. MacLENNAN. [L. S.]

Witnesses:
　CHAS. E. PARKER,
　CHAS. E. MILES.